Dec. 11, 1956    R. A. EDENS    2,773,402
MEANS FOR FORM CUTTING STRUCTURE AT THE PERIPHERIES
OF ROUND HOLES IN CURVED ELEMENTS
Filed Nov. 12, 1954
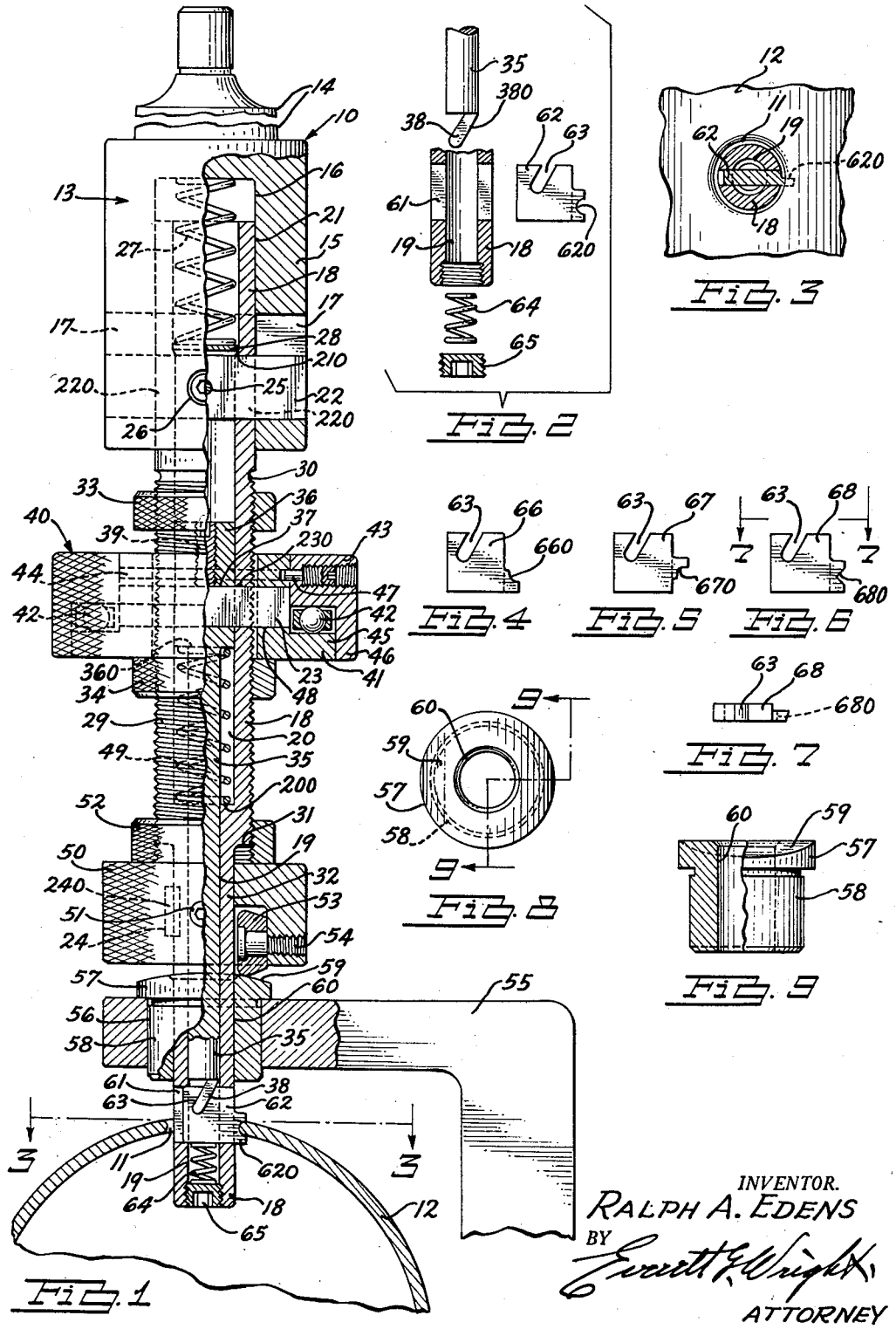
INVENTOR.
RALPH A. EDENS
BY
ATTORNEY United States Patent Office 2,773,402
Patented Dec. 11, 1956

2,773,402

MEANS FOR FORM CUTTING STRUCTURE AT THE PERIPHERIES OF ROUND HOLES IN CURVED ELEMENTS

Ralph A. Edens, Grosse Pointe Woods, Mich., assignor to Falcon Tool Company, a corporation of Michigan Application November 12, 1954, Serial No. 468,336

2 Claims. (Cl. 77—58)

This invention relates to a method and means for form cutting structure at the peripheries of round holes in curved elements.

In many instances it is desirable to shape or bevel the structure at the periphery of a hole cut in a curved element such as the wall of a tube or a curved plate. The cutting of the round hole in the wall of a tube or the like with the cutting tool radially disposed in respect to a wall of the curved element leaves a peripheral edge which is parallel to the radial line upon which the hole is drilled. This edge is usually sharp and ragged, and, for certain purposes, is undesirable. To form cut this raw edge with normally available means to the desired accuracy requires considerable skill, and is extremely time-consuming, particularly where a number of curved work pieces require form cutting at the periphery of round holes bored therein.

With the foregoing in view, the primary object of the invention is to provide an improved method and means for form cutting the edge structure at the periphery of holes bored or otherwise cut in curved elements.

Another object of the invention is to provide means for form cutting the edge structure at the periphery of round holes in curved elements which is easily and readily adapted for form cutting the edge structure at the periphery of various sizes of holes in curved elements of various thicknesses.

Other objects of the invention will become apparent by reference to the following detailed description taken in connection with the accompanying drawing, in which:

Fig. 1 is a vertical elevational view with portions shown in section illustrating a tool embodying the invention for form cutting the structure at peripheral edges of round holes in curved elements, the said tool being shown in cutting relationship with respect to a round hole in a curved work piece.

Fig. 2 is an exploded view part in section and part in elevation showing the cutter cam, cutter holder and cutter employed for rounding the edge of the structure at the periphery of a round hole in a curved element.

Fig. 3 is a horizontal sectional view taken on the line 3—3 of Fig. 1.

Figs. 4, 5 and 6 are elevational views of cutters for cutting an inner radius, an outer radius, and a V-edge respectively in the structure at the peripheral edge of a round hole in a curved element.

Fig. 7 is a plan view of the cutter shown in Fig. 6, the plan views of the other cutters being similar.

Fig. 8 is a plan view of the work curvature cam.

Fig. 9 is a view part in section and part in elevation taken on the line 9—9 of Fig. 8.

Referring now to the drawing wherein like numerals refer to like and corresponding parts throughout the several views, the novel method of form cutting the structure at the peripheries of holes in curved elements will be disclosed in conjunction with the novel means employed for accomplishing the method, it being understood that the method herein disclosed may be carried out by other means than are shown and described herein for the purpose of illustrating the invention.

The form cutting tool 10 illustrative of the invention for cutting structure at the periphery of a round hole 11 in curved work 12 comprises a holder-adapter 13 having a tapered shank 14 of a size and configuration to fit the rotating head of a machine tool and be rotated thereby. The said holder-adapter 13 has a cylindrical body 15 which is provided with an axial bore 16 from the bottom thereof and a diametrically disposed through key slot 17.

A spindle 18 which is bored at 19 and counterbored at 20 and 21 to provide interior shoulders 200 and 210 is provided with through slots 22 and 23 and a keyway 24 to accommodate keys 220, 230 and 240 respectively. The upper end of the spindle 18 is reciprocatingly mounted in the axial bore 16 of the body 15 of the holder-adapter 13 and is retained therein by the key 220 which extends through the keyway 22 of the spindle 18 into the key slot 17 of the body 15 of the holder-adapter 13. The said key 220 is pinned into the spindle 18 by a socket head screw 25 threaded into and extending through the wall of the spindle 18. An aperture 26 in the body 15 of the holder-adapter 13 provides access to the head of the socket head screw 25. A compression spring 27 disposed in the axial bore 16 of the body 15 of the holder-adapter 13 and in the counterbore 21 of the spindle 18 resiliently urges the spindle 18 to its extended position with respect to the holder-adapter 13. A washer 28 at the shoulder 210 of the counterbore 21 serves as a bearing betwen the compression spring 27 and the spindle 18 through which spring pressure is applied to the said spindle 18 to constantly urge it to its said extended position in respect to the holder-adapter 13. The key 220 causes the spindle 18 to rotate at all times with the holder-adapter 13.

The outside of the spindle 18 is threaded at 29 between a thread undercut 30 therein below the holder-adapter 13 and a shoulder 31 at the top of the lower end 32 of the said spindle 18, which lower end 32 is considerably reduced in diameter. On the threaded portion 29 of the spindle 18 are threaded upper and lower round exteriorly knurled cam rod travel limit nuts 33 and 34 respectively which may be adjusted to limit the distance the cam rod 35 may be moved axially within the bore 19 and lower counterbore 20 of the spindle 18.

The cam rod 35 is provided with a cylindrical head 36 having a key slot 37 diametrically cut therethrough to accommodate the key 23 which extends into and through the key slot 230 diametrically disposed through the spindle 18. The said cam rod 35 is keyed by the key 23 into engagement with a cam rod actuator grip 40 as hereinafter described. The cam rod 35 has an angularly depending flat cam 38 disposed at the lower end thereof while the upper end thereof is axially bored and threaded to accommodate a set screw 39 which fixes the key 23 in place.

The cam rod actuator 40 is mounted in slidable spaced relationship over the threaded portion 29 of the spindle 18 between the upper and lower limit cam rod travel nuts 33 and 34, and is composed of three major elements; namely, a collar 41, a ball bearing 42 and an outer sleeve 43 knurled for hand gripping. The collar 41 is provided with a circumferential groove 44 therearound near the top thereof and a radially disposed flange 45 at the bottom thereof. The ball bearing 42 rides on the top of the flange 45 and supports the outer sleeve 43 which has an annular depending flange 46 which circumferentially overlaps the periphery of the flange 45. A pin 47 is threaded into the outer sleeve 43 with its inner end extending into the said circumferential groove 44 in the collar 41 to retain the elements of the cam rod actuator 40 in assembled relationship. The collar 41 is provided with a diametrically disposed cam slot 48 into which the outer ends of the key 23 extend, thus, the cam rod 35 is keyed to the cam rod actuator 40 by the key 23 for longitudinal movement thereby within the limits permitted by the upper and lower limit cam rod travel nuts 33 and 34. A compression spring 49 disposed around the cam rod 35 in the counterbore 20 of the spindle 18 between the shoulder 200 of the said spindle 18 and the shoulder 360 below the head 36 of the cam rod 35 constantly urges the cam rod 35 upwardly from its advanced position with the cam rod actuator 40 disposed against the lower limit cam travel nut 34 as shown in Fig. 1 to its upwardly retracted position with the actuator 40 disposed against the upper limit cam travel nut 33.

A work follower cam carrier 50 is keyed to the spindle 18 below the shoulder 31 thereof for rotation therewith by a key 240 disposed in the keyway 24, and is longitudinally fixed on the spindle 18 by means of a set screw 51 and a lock nut 52 threaded on the lower end of the threaded portion 29 of the said spindle 18. The work follower cam carrier 50 includes a roller cam 53 journaled therein by means of a headed stud 54, the periphery of the roller cam 53 being disposed adjacent but in spaced relationship to the spindle 18 and below the lower face of the cam carrier 50.

A fixture 55 disposed above the work 12 has an aperture 56 therein in axial alignment with the round hole 11 in the work 12, the said aperture 56 being sufficiently large to receive and hold a work curvature cam 57 by its bushing 58, the said bushing 58 being formed to provide a cam surface 59 of the same radius as the radius of the curvature of the work 12. The cam 57 and its bushing 58 have a central aperture 60 therethrough to accommodate the lower end 32 of the spindle 18. The work 12 is supported below the fixture 56 in a fixed position by any suitable means, not shown, with the center of the hole 11 therein disposed in alignment with the central aperture 60 through the cam 57 and cam bushing 58.

The spindle 18 has a rectangular tool slot 61 cut therethrough near the lower end thereof to accommodate in laterally slidable relationship a substantially rectangular tool element 62, which tool element 62 has a diagonal cam slot 63 in the top thereof for receiving the angularly disposed flat cam 38 depending from the cam rod 35. A compression spring 64 disposed in the bottom of the spindle 18 below the tool element 62 and secured therein by a threaded retainer plug 65 firmly holds the tool element 62 against the lower face 380 of the angularly disposed flat cam 38. The tool element 62 includes a semi-circular cutter 620 which forms the work 12 semi-circular at the periphery of the round hole 11 therein. The depth of the diagonal cam slot 63 determines the extent of the lateral movement of the tool element 62 and hence the depth of the cut made by the cutter 620.

Tool elements 66, 67 and 68 shown in Figs. 4, 5, 6 and 7 are like and similar to the tool element 62 except that the cutters 660, 670 and 680 thereof are formed to cut the work at the periphery of a round hole therein with an inner radius, an outer radius or a V-shape respectively. Obviously, other cutting tool elements may be employed to cut the work at the periphery of a round hole therein to any desired cross sectional configuration. The form cutting tool 10 disclosed herein accomplishes the forming of the structure at the periphery of a round hole in a curved work piece by the method steps of placing a cutter opposite the edge of the structure to be cut, rotating the cutter, maintaining the cutter opposite the edge of the structure to be cut simultaneously with the rotation thereof, and advancing the cutter against the work during its rotation.

In operation, a tool 10 embodying the invention is placed in the rotating head of a machine for rotation thereby. The cam rod actuator grip 40 is retracted by the compression spring 49 to a position against the upper cam rod travel limit nut 33 which has been moved to such a position that the cam rod 35 has moved the cutting tool element 62 to a non-cutting position with the cutter 620 thereof retracted. The lower cam rod travel limit nut 34 is moved to a position that will limit the downward movement of the cam rod actuator grip 40 to a point where the maximum desired cut will be made on the structure at the periphery of the round hole 11 in the curved work 12 by the cutter 620 of the cutting tool element 62. Curved work 12 having a round hole 11 cut therein is axially positioned below the cutting tool 10, and a work curvature cam 57 is placed in the fixture 55 with the central aperture 60 of the cam 57 in axial alignment with the cutting tool 10. The said work curvature cam 57 has its cam surface 59 formed to the same radius as the work 12. The work follower cam carrier 50 is adjusted in respect to the cam surface 59 of the work curvature cam 57 so that the cam roller 53 contacts the cam surface 59 and the cutter 620 of the cutting tool element 62 is disposed in alignment with the edge of the structure 12 at the periphery of the round hole 11. The form cutting tool is then rotated, and the operator advances the cutter 62 toward and into the work 12 by pressing down on the cam rod actuator grip 40 which moves the cam rod 35 downwardly so that the diagonal cam 38 at the lower end thereof acts on the said cutter 62 to move it laterally outward from the spindle 18 as it rotates. After the structure at the periphery of the round hole 11 in the work 12 is form cut, the operator releases the cam rod actuator 40 and the cutter 62 retracts into the spindle 18. The work tool 10 is then lifted to remove the spindle 18 from the work 12, and the operation may be repeated on like work 12.

Although but a single embodiment of the invention has been disclosed and described and but a single method of carrying out the invention has been disclosed, it is obvious that many changes may be made in the size, shape, arrangement and detail of the various elements of the invention and that modifications may be made in the method steps employed to carry out the invention, all without departing from the spirit and scope thereof as defined by the appended claims.

I claim:

1. Means for form cutting structure at the peripheries of round holes in curved work elements comprising, in combination, a tool holder, a spindle reciprocably mounted in said tool holder and turnable thereby, a radially disposed cutting tool diametrically slidable in said spindle at the lower end thereof, cam means movable axially within said spindle engaging said cutting tool to advance and retract said cutting tool radially against the periphery of a hole in said work element, arcuate cam means fixed in axially spaced relationship above said hole in said work element, said arcuate cam means having an aperture therethrough through which said spindle is rotatably disposed, said arcuate cam means having the same radius as said work element disposed with the curvature thereof parallel to the curvature of said work element, a roller cam follower keyed on said spindle with the roller disposed substantially above the cutting edge of said tool, spring means constantly urging said spindle axially outwardly from said tool holder causing said roller cam follower to follow said arcuate cam, and means for advancing said first mentioned cam against said cutting tool to move said cutting tool into cutting engagement with the structure at the periphery of said round hole in said work element as the spindle reciprocates responsive to rotation of the tool holder and the action of the roller cam follower against said arcuate cam.

2. Means for form cutting structure at the peripheries of round holes in curved work elements comprising, in combination, a tool holder, a spindle reciprocably mounted in said tool holder and turnable thereby, a radially disposed form cutting tool diametrically slidable in said spindle near the lower end thereof, a cam rod movable axially within said spindle including a cam at the lower end thereof engaging said cutting tool to advance and retract the same against the structure at the periphery of a hole in said work element, spring means below said cutting tool constantly urging it against the said cam rod cam, arcuate cam means fixed in axially spaced relationship above said hole in said work element, said arcuate cam means having an aperture therethrough through which said spindle is rotatably disposed, said arcuate cam means having the same radius as said work element disposed with the curvature thereof parallel to the curvature of said work element, means supporting said arcuate cam means adapted to receive other cam means of other curvature to accommodate the form cutting means to form cut the peripheries of round holes in curved work elements having other curvatures, a roller cam follower keyed on said spindle with the roller thereof disposed substantially above the cutting edge of said cutting tool, spring means constantly urging said spindle axially downwardly from said tool holder causing said roller cam follower to follow said arcuate cam, means carried by said spindle operable during the rotation thereof for advancing said cam rod axially causing the cam thereof to engage and move said form cutting tool into cutting engagement with the structure at the periphery of said round hole in said work element as the spindle reciprocates responsive to the rotation of the tool holder and the action of the roller cam follower against said arcuate cam, and cam rod travel limit means threaded on said spindle adjustable to limit the travel of the cam rod whereby to limit the radial movement of the form cutting tool.

References Cited in the file of this patent
UNITED STATES PATENTS

| | | |
|---|---|---|
| 1,312,737 | Krueger | Aug. 12, 1919 |
| 2,352,348 | Seme | June 27, 1944 |
| 2,422,279 | Zimmer | June 17, 1947 |